Dec. 23, 1952 — H. KLAUE — 2,622,657
MANUFACTURE OF FLEXIBLE HOSE
Filed Dec. 15, 1949
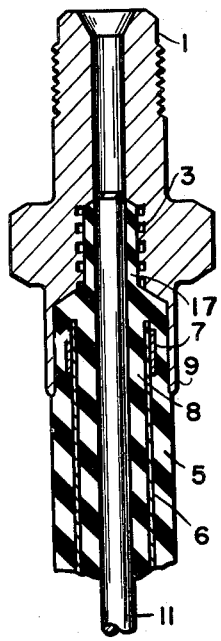
Fig-1-
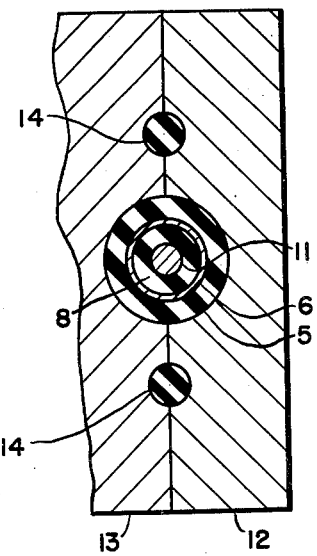
Fig-2-
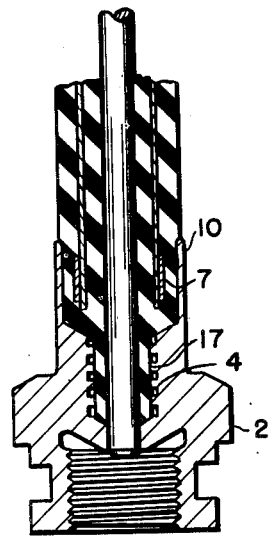
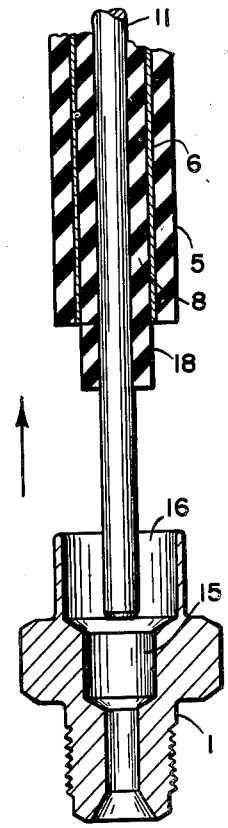
Fig-3-
INVENTOR.
HERMANN KLAUE
BY
ATTORNEY Patented Dec. 23, 1952

2,622,657

UNITED STATES PATENT OFFICE 2,622,657

MANUFACTURE OF FLEXIBLE HOSE

Hermann Klaue, Ueberlingen on the Bodensee, Germany

Application December 15, 1949, Serial No. 133,193
In France December 31, 1948

1 Claim. (Cl. 154—8)

This invention relates to tubing and particularly to a flexible hose provided at its end with connecting armatures.

Flexible tubing of this type is often used in vehicle construction for the conveyance of brake fluids, fuel, oil, benzine and the like liquids; this tubing must possess resistance to high pressure; it carries at its ends, as stated above, connecting means which in the following will be shortly denoted as connecting nipples.

In order to comply with the above stated requirements a great variety of one or two-piece connector-provided hoses have been designed.

It is the main object of this invention to simplify the manufacture of these connecting nipples-provided flexible hoses and to improve at the same time their operational efficiency.

It is also an object of the invention to improve the union between the hose ends and the connecting nipples and to promote hereby the working safety and reliability of the flexible tubing.

It is another object of the invention to increase the pressure resistance of the tubing without reduction of its flexibility.

It is a further object of the invention to eliminate the use of the hitherto customary very complicated mechanical connecting nipples means and to base a more satisfactory coaction of the hose ends and the connectors on a somewhat chemical basis.

It is an important object of the invention to simplify the mode of attachment of the connecting nipples to the hose ends and to hereby reduce manufacturing costs.

With the above recited and additional objects in view which will become apparent as this specification proceeds the invention consists herein that a crude rubber hose having connecting nipples applied to its end is vulcanized in a heated mold.

In conformity with the above the process by which the hose ends and the connectors are united comprises subtantially the following steps:

The formation of an inner crude rubber hose section on a mandrel by spraying or by an equivalent method, for instance, wrapping, The drawing of a fabric web over this inner hose section, The application of an outer crude rubber layer to said web covered inner section by wrapping or spraying, The fitting of the connecting nipples onto the ends of the thus produced crude tubular rubber body, Placement of the crude rubber body including its connectors in a heated mold, uniting of the same by vulcanization and removal from the mandrel.

Two methods of executing this manufacturing process are by way of example illustrated in the accompanying drawing.

In the drawing

Fig. 1 shows a cross section of the crude rubber hose body preparatory to its vulcanization, Fig. 2 shows a vertical sectional view of a heating mold accommodating said rubber hose and Fig. 3 shows a vertical sectional view of one end of a connector provided crude rubber hose preparatory to its vulcanization in conformity with another modification of this invention.

The hose manufacturing method forming the subject matter of this invention will now be described more in detail and with reference to the drawing.

An inner hose section 8 is formed by spraying a rubber solution on a mandrel 11. Hereupon a fabric web 6 is pulled over crude rubber section 8; the length of the webbing is preferably smaller than the length of section 8 so that the latter protrudes from the web cover 6 at both ends. The web 6 is fastened to the hose section 8 by clamping sleeves 7.

The outer rubber layer 5 is applied to the web covered inner section 8 by spraying or by wrapping a rubber band about the same. The ends 17 of the thus produced rubber body 5, 6, 8 are preferably given a smaller thickness.

Hereupon, the connecting nipples 1, 2 are shoved onto the ends of the tubular rubber body 5, 6, 8 in such a manner that, the connectors contact extensions 17 of rubber body 5, 6, 8 and that the connector extensions 9, 10 overlap the outer face of the rubber layer 5. It is recommended that the connectors 1, 2 are provided with inner grooves or threads 3, 4 in order to enlarge the contacting surface and to thereby produce a better coherence between the connectors and the crude rubber hose during the ensuing vulcanization.

For this purpose, the connecting nipples carrying tubular rubber body 5, 6, 8 is inserted together with its mandrel 11 into a vulcanizing mold preferably composed of the two sections 12, 13 and vulcanized by application of heat. The surplus rubber is removed into bores 14. The extensions 9, 10 of the connectors are during the vulcanization firmly anchored into the outer rubber layer 5. Extensions 17 of the rubber hose body 5, 6, 8 serve to enlarge the contact between the connectors and the hose. Upon completed vulcanization the mandrel 11 is removed from the finished hose.

The above described manufacturing process may be modified by application to the web coated tube 8 and consecutive formation of the outer layer 5 by spraying or wrapping. The hollow spaces which in this case will result in the connecting nipples for the time being are filled upon setting-together of the mold halves by the thus compressed rubber.

A further modification of the invention is illustrated in Fig. 3.

As stated previously, the inner section 8 of the rubber hose is extended at both ends to provide a contact of the rubber hose with the metallic connecting nipples on a possibly large surface.

Since the inner section 8 of the rubber hose must be provided with web 6 in the unvulcanized state the difficulty may arise of keeping the extensions protruding into the connectors free from the webbing. In mass production of the tubing a simple solution of this problem has a great economical importance. A simple solution is provided by the embodiment of the invention shown in Fig. 3, which illustrates one end of a crude rubber hose body prior to its placement into a galvanizing mold.

The parts of the device which are analogous to those of Figs. 1 and 2 are denoted with the same numerals.

The crude rubber hose is produced as an endless continuous article; a section 5, 6, 8 is severed from the same in accordance with the required length and shoved onto mandrel 11.

A crude rubber sleeve 18 is then applied to both ends of the rubber hose body 5, 8; only one end is shown in the drawing. The connecting nipples 1, 3 to be united with the hose body is now shoved onto the rubber hose 5, 8 in the direction of the arrow. The article is then inserted into a mold; during the ensuing vulcanization the rubber sleeve 18 is intimately united with the rubber hose 5, 8. The wall of the inner space 15 is firmly connected with the outer face of the sleeve 18 and so is the inner wall of space 16 with the end portion of hose 5, 8.

The invention has been described with reference to a preferred embodiment and it will be understood that many variations and modifications thereof may be resorted to without departure from the scope of the invention as defined in the following claim.

I claim:

A method for the manufacture of a pressure resistant rubber hose comprising spraying a rubber solution onto a cylindrical mandrel to form thereon a tubular crude rubber body, covering said rubber body with a fabric web which is shorter than said body, covering the said fabric web carrying rubber body with a tubular rubber body which is longer than said web but ends short of said first rubber body, whereby a tubular composite rubber body results consisting of an inner and outer tubular rubber body and an intermediary fabric web, applying to the ends of said rubber body connecting nipples and uniting said rubber bodies, said fabric web and said connecting nipples by vulcanization.

HERMANN KLAUE.

REFERENCES CITED

The following references are of record in the file of this patent:

UNITED STATES PATENTS

| Number | Name | Date |
| --- | --- | --- |
| 1,190,292 | Hopkins | July 11, 1916 |
| 1,229,175 | Christopherson | June 5, 1917 |
| 1,721,253 | Loughead et al. | July 16, 1929 |
| 1,756,698 | Oden | Apr. 29, 1930 |
| 2,300,517 | Milton | Nov. 3, 1942 |
| 2,463,231 | Wyatt | Mar. 1, 1949 |
| 2,470,599 | Billmeyer | May 17, 1949 |